US011266083B2

(12) United States Patent
Adhikari et al.

(10) Patent No.: US 11,266,083 B2
(45) Date of Patent: Mar. 8, 2022

(54) SPRAYABLE POLYMER MEMBRANE FOR AGRICULTURE

(71) Applicant: COMMONWEALTH SCIENTIFIC AND INDUSTRIAL RESEARCH ORGANISATION, Canberra ACT (AU)

(72) Inventors: Raju Adhikari, Glen Waverley (AU); Philip Casey, Mt Waverly (AU); Keith L. Bristow, Townsville (AU); George Freischmidt, Clayton (AU); John Hornbuckle, Griffith (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 127 days.

(21) Appl. No.: 15/316,241

(22) PCT Filed: Jun. 3, 2015

(86) PCT No.: PCT/AU2015/000334
§ 371 (c)(1),
(2) Date: Dec. 5, 2016

(87) PCT Pub. No.: WO2015/184490
PCT Pub. Date: Dec. 10, 2015

(65) Prior Publication Data
US 2017/0135292 A1    May 18, 2017

(30) Foreign Application Priority Data
Jun. 3, 2014    (AU) .................. 2014902122

(51) Int. Cl.
*A01G 13/02*    (2006.01)
*C08L 75/04*    (2006.01)
(Continued)

(52) U.S. Cl.
CPC ..... *A01G 13/0275* (2013.01); *C08G 18/0814* (2013.01); *C08G 18/0823* (2013.01);
(Continued)

(58) Field of Classification Search
CPC ........ A01G 24/00; A01G 24/10; A01G 24/30; A01G 24/35; A01G 24/48; A01G 24/60;
(Continued)

(56) References Cited

U.S. PATENT DOCUMENTS 3,920,598 A  *  11/1975  Reiff ................. C08G 18/7818
                                                          524/871
3,979,198 A  *   9/1976  Bardsley ................. C05B 7/00
                                                             71/1
(Continued)

FOREIGN PATENT DOCUMENTS

FR    2 168 489 A1      8/1973
FR      2168489 A1  *   8/1973   ............. G03G 15/00
(Continued)

OTHER PUBLICATIONS

FR 2 168 489 A1 Machine English Translation
(Continued)

*Primary Examiner* — Brady W Frazier
(74) *Attorney, Agent, or Firm* — Ladas & Parry LLP

(57) ABSTRACT

A process for preparing a polymeric membrane for soil materials used in crop production comprising providing an aqueous dispersion of polyurethane and spraying the aqueous dispersion onto soil materials to be used in crop production to form a polymeric membrane.

23 Claims, 4 Drawing Sheets

(51) Int. Cl.

| | | |
|---|---|---|
| *C09D 175/04* | (2006.01) | |
| *A01G 13/00* | (2006.01) | |
| *C08G 18/75* | (2006.01) | |
| *C08G 18/08* | (2006.01) | |
| *C08G 18/32* | (2006.01) | |
| *C08G 18/12* | (2006.01) | |
| *C08G 18/42* | (2006.01) | |
| *C08G 18/48* | (2006.01) | |
| *C08G 18/38* | (2006.01) | |
| *C08G 18/24* | (2006.01) | |
| *C08G 18/40* | (2006.01) | |
| *C08G 18/28* | (2006.01) | |

(52) U.S. Cl.
CPC ........... *C08G 18/12* (2013.01); *C08G 18/246* (2013.01); *C08G 18/2865* (2013.01); *C08G 18/3206* (2013.01); *C08G 18/3228* (2013.01); *C08G 18/3823* (2013.01); *C08G 18/4018* (2013.01); *C08G 18/4277* (2013.01); *C08G 18/4825* (2013.01); *C08G 18/755* (2013.01); *C08L 75/04* (2013.01); *C09D 175/04* (2013.01); *A01G 2013/004* (2013.01); *C08G 2310/00* (2013.01)

(58) Field of Classification Search
CPC ........... A01G 13/0275; C08G 18/0814; C08G 18/0823; C08G 18/12; C08G 18/246
USPC .............................. 47/9, 1.01 F, 56, 58.1 SC
See application file for complete search history.

(56) References Cited

U.S. PATENT DOCUMENTS

| | | | | | |
|---|---|---|---|---|---|
| 4,129,435 | A | * | 12/1978 | Tokematsu | A01N 25/10 504/360 |
| 4,241,537 | A | * | 12/1980 | Wood | C08G 18/4837 47/77 |
| 4,243,563 | A | * | 1/1981 | Ferm | C09K 17/42 423/562 |
| 4,734,439 | A | * | 3/1988 | Reischl | B01D 17/0202 210/807 |
| 5,700,867 | A | * | 12/1997 | Ishiyama | C08G 18/0823 524/539 |
| 5,747,297 | A | * | 5/1998 | Clarke | A61K 8/73 435/101 |
| 6,350,594 | B1 | * | 2/2002 | Clarke | A61K 8/73 426/49 |
| 2009/0105411 | A1 | * | 4/2009 | Erdem | C08G 18/0866 524/591 |
| 2012/0220454 | A1 | * | 8/2012 | Chen | A01N 25/00 504/100 |
| 2013/0123104 | A1 | * | 5/2013 | McKnight | A01N 25/30 504/206 |
| 2014/0271863 | A1 | * | 9/2014 | Anderson | A61K 47/32 424/486 |

FOREIGN PATENT DOCUMENTS

| | | |
|---|---|---|
| GB | 1076688 A | 7/1967 |
| WO | 1998/001510 A1 | 1/1998 |

OTHER PUBLICATIONS

Methocel Technical Bulletin 10, 2013, pp. 1-15.
Mormile, P., et al., "Monitoring of the degradation dynamics of agricultural films by IR thermography", Polymer Degradation and Stability, 92, 2007, pp. 777-784.
Satore, L., et al., "Preparation and Performance of Novel Biodegradable Polymeric Materials Based on Hydrolyzed Proteins for Agricultural Application", J. Polym. Environ., Feb. 15, 2013, 8 pages.
Chiellini, E., et al., "Gelatin-Based Blends and Composites. Morphological and Thermal Mechanical Characterization", Biomacromolecules, vol. 2, No. 3, 2001, pp. 806-811.
Li, D., et al., "Preparation of Bio-material Liquid Film and Its Function of Reducing Soil Water Evaporation", Advanced Materials Research, vols. 328-330, Sep. 2, 2011, pp. 1462-1466.

* cited by examiner

SPRAYABLE POLYMER MEMBRANE FOR AGRICULTURE

CROSS-REFERENCE TO RELATED APPLICATION

This U.S. application claims priority under 35 U.S.C. 371 to, and is a U.S. National Phase application of, the International Patent Application No. PCT/AU2015/000334 filed 3 Jun. 2015 which claims priority from Australian Application No. 2014902122 filed on 3 Jun. 2014, the disclosures of which are incorporated in their entirety by reference herein.

FIELD

The invention relates to the production of a sprayable polymer membrane for agriculture, a process for preparing an aqueous based polymer dispersion for forming a polymeric membrane by spray application to soil materials used in crop production. The invention further relates to a method of enhancing crop production through the use of such membrane.

BACKGROUND

Plastic is widely used in agriculture to enhance crop production by modifying soil temperature, suppressing weeds and conserving water. The plastic which is most widely used is a preformed continuous non-biodegradable polyolefin film which is spread over the soil using specialist application equipment to shape and apply the plastic to prepared soil. Crops are planted through cuts or holes produced in the plastic. The plastic film must be deployed before use and removed after each growing season (or series of seasons) which contributes to a significant increase in cost through material and transport, additional associated labour, specialist equipment and end of life waste disposal. Complete recovery of the waste plastic is problematic as a portion of the plastic may be buried, may become torn and partly degraded and thus difficult to recover. Consequently, plastic which is not recovered presents not only a significant environmental problem but can complicate the preparation and deployment of new plastic in successive growing seasons.

Attempts have been made to prepare a plastic film in situ by spraying latex to soil (e.g. polyvinyl acetate, polyacrylates, styrene butadiene (SBR)) but this alternative has received little practical use due to the difficulty of producing a film which provides the required film properties during the growing season and which can be readily applied with typical on farm spraying equipment.

Sprayable biodegradable films based on natural polysaccharides (Immirzi et al 2009, Mormile et al 2007, Schettini et al 2007), hydrolysed proteins from waste products of leather alone and/or blends with synthetic and natural polymers (Chiellinie et al 2001) have been reported as a coating on soils.

Natural polymers from renewable sources such as seaweeds and crustaceous shells containing natural polymers and reinforcing cellulosic fibres from waste materials such as seeds and peels from tomato, olive and hemp processing are being tested as waterborne sprayable films (www.ictmp.ct.cnr.it).

Liquid films comprising of a mixture of biomaterial kelp and polyvinyl alcohol (PA) have also been tested on soils (Advanced Materials Research Vols. 328-330, 1462-1466, 2011).

Commercially available sprayable polymer emulsions/dispersions are predominantly used for protective and/or decorative coating applications across a variety of industrial applications. Film forming polymers are used as spray adjuvants and anti-transpirant films for horticulture and agriculture to form an artificial film on plant surfaces (e.g. leaves) for disease and pest control. These include oils, waxes, silicones and a variety of plastics films including products such as Nu-Film-Pn Nu-Film-17 film, Vapo-Gard film forming composition (based on natural pinolene) from Agspec and Moisturin, a vinyl-acrylic film from WellPlant. The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of this application.

SUMMARY

There is provided a process for preparing a polymeric membrane for soil materials used in crop production comprising providing an aqueous dispersion of polyurethane, preferably an aqueous dispersion of ionic polyurethane; and spraying the aqueous dispersion onto soil materials to be used in crop production to form a polymeric membrane.

In a further embodiment there is provided an aqueous dispersion of polyurethane for application to soil to form a membrane wherein the polyurethane comprises ionic groups selected from the group consisting of carboxylate, sulfonate and ammonium.

In one set of embodiments the ionic groups are selected from the group consisting of pendent carboxylate, pendent sulfonate, pendent ammonium and intra-chain quaternary ammonium, preferably from pendent carboxylate, pendent quaternary ammonium and intra-chain quaternary ammonium.

In one set of embodiments the polyurethane comprises the reaction product of (a) a diisocyanate; and (b) an active hydrogen compound comprising ionic or ionisable groups (preferably selected from the group consisting of carboxylic acid, tertiary amine and quaternary amine groups). In a preferred set of embodiments the polyurethane is a product of reacting a diisocyanate with a prepolymer selected from polyol or polyamine to form an isocyanate terminated prepolymer and reacting the isocyanate terminated prepolymer with a chain extender monomer comprising an ionic or ionisable group to provide the polyurethane.

In one set of embodiments the polyurethane is biodegradable. Generally speaking, biodegradability will be provided by incorporation of at least a portion of polyester polyol or polyether polyol units in the polyurethane.

In a further set of embodiments there is provided a method of mulching in agriculture comprising applying an aqueous dispersion of polyurethane to an area of soil for use in crop production to form a mulch membrane and planting a crop before, during or after applying the aqueous dispersion. The crop, in a form such as seed or seedlings, may be planted through the membrane or the crop may be planted before application of the membrane.

DETAILED DESCRIPTION

Throughout the description and the claims of this specification the word "comprise" and variations of the word, such as "comprising" and "comprises" is not intended to exclude other additives, components, integers or steps.

The term "active hydrogen containing" refers to compounds having hydrogen atoms which can react with isocyanate groups. For example, such hydrogen atoms include hydrogen atoms attached to oxygen, nitrogen or sulphur and include compounds which have at least two groups selected from the group consisting of —OH, —SH and —NH—. Such compounds typically range widely in molecular weight from about 50 to about 10,000.

The term "membrane" is used to refer to a thin pliable sheet or film of material forming a barrier or lining. In the present context the membrane generally acts to provide a mulch and thereby suppress weed growth and restrict water loss from the soil. The membrane generally improves plant growth; in many cases allowing early harvesting of crops. The membrane avoids soil deterioration resulting from use of plastics such a polyethylene and indeed generally acts to improve the fertility and health of the soil.

The term "mulch" is used to refer to a layer of membrane applied to the surface of an area of soil used in crop production.

The term "plants" includes, seedlings, sapplings, roots, tebers, and material from which plants may be propagated.

The term "agriculture", refers to the cultivation of animals, plants, fungi, and other life forms. In particular in the context of the present invention agriculture refers to cultivation of crops for food, fiber, biofuel, medicinal and other products used to sustain and enhance human life.

The term "soil materials" refers to soil and its solid components, including minerals and/or organic matter and a porous component that hold gases, water, solutes and organisms. Soil materials can vary from being soft and friable in some situations to a hard and structureless mass with concrete like properties in others. While soils are the foundation for natural and agricultural ecosystems, they also serve as the foundation for most construction and are used in a range of engineering and other applications, including concrete, road foundations, liners in irrigation canals and aquaculture ponds, and as capping materials for mine waste dumps and municipal waste dumps. In its broadest context soil materials used in agriculture include construction materials such as concrete which may be used in agriculture applications such as structures for retaining soil, irrigation channels or conduits and the like.

The term "soil" refers to the life-supporting upper surface of earth that is the basis of all agriculture. It contains minerals and gravel from the chemical and physical weathering of rocks, decaying organic matter (humus), microorganism, insects, nutrients, water, and air. Soils differ according to the climate, geological structure, and rainfall of the area and are constantly being formed, changed and removed by natural, animal, and human activity.

The term "pendent" refers to a chemical group covalently attached to the backbone chain of a polymer. The term "intra-chain" refers to a group within the main chain which forms the backbone of the polyurethane.

The term "polyol" denotes a compound, which has active hydrogen containing groups that can be reacted and includes materials having an average of about two or more hydroxyl groups per molecule.

Polyols include but are not limited to diols, triols, and tetrols and macrodiols. Preferably the polyol has a number-average molecular weight (Mn) of 500-10,000 Daltons, preferably 500-200 Daltons, and more preferably 500-1000 Daltons. The polyol may comprise further functional groups such as one or more selected from the group consisting of hydroxyl, thiol, carboxylic acid and amine groups.

The polyols which can be used in the present invention includes higher polymeric polyols such as polyester polyols and polyether polyols, as well as other acceptable "polyol" reactants, which have an active hydrogen component such as polyester polyols, polyhydroxy polyester amides, hydroxyl containing polycaprolactones, hydroxy-containing acrylic interpolymers, hydroxy-containing epoxies, and hydrophobic polyalkylene ether and carbinol type polydimethylsiloxane polyols.

Examples of polyether polyols include polyethylene glycols (PEGs) and polypropylene glycols (PPGs) and copolymers.

The polyester polyols are esterification products prepared by the reaction of organic polycarboxylic acids or their anhydrides with a stoichiometric excess of a polyol. Examples of suitable polyols for use in the reaction include polylactic acid polyol, polyglycolic polyol, polyglycol adipates, polyethylene terepthalate polyols, polycaprolactone polyols, orthophthalic polyols, and sulfonated polyols, etc. The polycarboxylic acids and polyols are typically aliphatic or aromatic dibasic acids and diols. The diols used in making the polyester include alkylene glycols, e.g., ethylene glycol, butylene glycol, neopentyl glycol and other glycols such as bisphenol A, cyclohexane diol, cyclohexane dimethanol, caprolactone diol, hydroxyalkylated bisphenols, and polyether glycols.

Suitable carboxylic acids include dicarboxylic acids and tricarboxylic acids, e.g., maleic acid, succinic acid, glutaric acid, adipic acid, pimelic acid, azelaic acid, sebacic acid, chlorendic acid and 1,2,4-butane-tricarboxylic acid.

The average molecular weight for the polyester polyol can be selected so as to control the resilience of the membrane formed on application to soil materials. Higher molecular weight may be used to provide high elongation and low tensile modulus at a given elongation. The preferred molecular weight (Mn) for the polyols and polyamides used in this invention is from about 500 to 20,000.

The aqueous dispersion of polyurethane may be prepared by reacting a diisocyanate with an active hydrogen containing monomer such as dihydroxy polyol to form an isocyanate terminated prepolymer. The active hydrogen containing monomer may comprise of ionic or ionisable pendent groups or the isocyanate capped prepolymer may be reacted with a chain extender to provide ionic or ionisable groups. In one set of embodiments the prepolymer is chain extended with a polyol, polyamide, polyamine or mixture thereof which may comprise ionic or ionisable pendent groups. In one set of embodiments the prepolymer is chain extended with a primary or secondary amine having at least two active hydrogens and which may be quaternized to provide cationic groups.

The reaction to form the prepolymer may be conducted in the presence of a catalyst such as selected from stannous octoate, dibutyltin dilaurate, di($C_1$-$C_4$ alkyl)tin dichlorides and tertiary amine compounds such as triethyl amine and bis(dimethylaminoethyl) ether, morpholine compounds such as dimorpholinodiethyl ether, bismuth carboxylates, zincbismuth carboxylates, iron (III) chloride, potassium octoate, potassium acetate, and DABCO® (bicycloamine).

The polyisocyanate used in the invention is preferably an aliphatic polyisocyanate which is conducive to providing biodegradability.

Specific examples of suitable aliphatic polyisocyanates include those selected from the group consisting of hexamethylene 1,6-diisocyanate, 1,12-dodecane diisocyanate, 2,2, 4-trimethyl-hexamethylene diisocyanate, 2,4,4-trimethyl-hexamethylene diisocyanate, 2-methyl-I,5-pentamethylene diisocyanate, alkyl-lysinediisocyanate (such as ethyl-lysine diisocyanate and mixtures thereof). Specific examples of suitable cycloalipahtic polyisocyanates include dicyclohexlymethane diisocyanate, isophorone diisocyanate, 1,4-cyclohexane diisocyanate, 1,4-cyclohexane bis(methylene isocyanate), 1,3-bis(isocyanatomethyl) cyclohexane, and mixtures thereof. In general we have found isophorone diisocyanate or cyclohexane bis(methylene isocyanate), to be particularly useful in providing the desired properties of biodegradability and membrane formation properties to match the growing season of the crop.

Ionic groups are preferably incorporated into the polyurethane to provide a stable water based dispersion. This allows the use of organic solvents to be minimised and assists in providing a resilient membrane on application to soil materials. Examples of preferred anionic ionisable compounds include 2,2-bis(hydroxymethyl) propionic acid—also known as dimethylol propanoic acid (DMPA), tartaric acid, dimethylol butanoic acid (DMBA), glycollic acid, thioglycollic acid, lactic acid, malic acid, dihydroxy malic acid, dihydroxy tartaric acid, and 2,6-dihydroxy benzoic acid.

The acid ionisable groups are generally incorporated in the polymer or prepolymer in an inactive form and activated by a salt-forming compound such as a tertiary amine. Neutralization of the polymer or prepolymer having dependent carboxyl groups with the tertiary amine converts the carboxyl groups to carboxylate anions, thus having a solubilizing effect. Suitable tertiary amines, which can be used to neutralize the polymer include organic tertiary amine bases such as triethyl amine (TEA), N-methyl morpholine and inorganic bases sodium hydroxide or ammonia. The preferred tertiary amine is triethyl amine (TEA). It is recognized that primary or secondary amines may be used in place of tertiary amines, if they are sufficiently hindered to avoid interfering with the chain extension process.

Aqueous dispersions of cationic polyurethane polymers may be prepared using chain extenders which comprise of secondary amines. For instance an N-alkyl dialkanolamine such as N-methyl diethanolamine (MDEA) may be used as a chain extender and then the product quaternised by reacting with a quaternizing agent. Cationic polyurethanes may also be prepared having tertiary amine groups tethered to the polyurethane backbone. Such cationic polyurethanes may be prepared from polyols substituted with side chains comprising a tertiary amine group which may be quaternised and neutralised with an organic acid such as formic acid, acetic acid, propionic acid, succinic acid, glutaric acid, butyric acid, lactic acid, malic acid, citric acid, tartaric acid, malonic acid and adipic acid; organic sulfonic acids such as sulfonic acid, paratoluene sulfonic acid and methanesulfonic acid; inorganic acids such as hydrochloric acid, sulfuric acid, nitric acid, phosphoric acid, boric acid, phosphorous acid and fluoric acid. Examples of polyurethanes having tethered cationic groups are disclosed in WO02012/058534, US2008/0090949, and US2005/0112203, EP application No. 92309879.2, US 2013/0316098 and U.S. Pat. No. 5,561,187.

If desired chain extension may be achieved using one or more polyamines. Organic compounds having two or more primary and/or secondary amine groups may be used. Suitable organic amines for use as a chain extender include di-ethylene tri-amine (DETA), ethylene diamine (EDA), meta-xylylene diamine (MXDA), and aminoethyl ethanolamine (AEEA). Also suitable for practice in the present invention are propylene diamine, butylene diamine, hexamethylene diamine, cyclohexylene diamine, phenylene diamine, tolylene diamine, xylene diamine, 3,3-dichlorobenzidene, 4,4-methylene-bis (2-chloroaniline), and 3,3-dichloro-4,4-diamino diphenylmethane.

In one set of embodiments the polyurethane is formed from a polyether diisocyanate prepolymer such as a polyethylene glycol (PEG) or polypropylene glycol (PPG) diisocyanate and is reacted with a chain extender comprising one or more amine or carboxylic functional groups for providing ionisable groups in the polyurethane polymer.

In a further embodiment, the polyurethane is formed from a prepolymer such as a polyether, polyester or poly ether ester prepolymer wherein the prepolymer comprises one or more pendent groups for forming carboxylate or quaternary amine ionic groups in the polyurethane polymer. In this embodiment, the chain extender may be any suitable active hydrogen compound such as a polyol or polyamine.

We have found that the ionic groups provide emulsifier properties which assist in forming a stable membrane and it helps polymer dispersion in water. The method of synthesis and its amount may dictate the emulsion properties such as viscosity, particle size and subsequent physico-mechanical membrane properties. Cationic polyurethanes provide strong adhesion properties on anionic surfaces.

In one embodiment the polyurethane present in the dispersion is cross linked by addition of a suitable ionic cross linker. Example of suitable cross linkers may be selected from the group consisting of any divalent, trivalent cations such as $Ca^{2+}$, $Mg^{2+}Al^{3+}$ for ionic polymers.

The polyurethane can also be crosslinked covalently using hydroxy or amines chain extenders containing more than two functional groups or slight excess of diisocyanate or using polyisocyanate.

Crosslinking is preferred in the polyurethane (PU) structure. In contrast, acrylics which are crosslinked are generally non-degradable. Most PU coating spray examples comprise of thermoplastic formulations with slightly crosslinked structure to reinforce mechanical properties achieved with slight excess of isocyanate.

We have found that the cross linker, particularly ionic or non-ionic covalent crosslinker, may be used in an amount of, for example, in the range of from 2 to 20 mol % of the polyurethane.

We have found that the cross linked polyurethane provides better membrane formation and is more resilient. The crosslinking factor reduces wicking on soil and improves membrane formation and mechanical integrity. It also helps to control properties such as water absorption and permeability, solubility, viscosity, particle size and biodegradability. In PU formulation, we have found it advantageous to use a slight excess of isocyanate to provide crosslinking.

The membrane formed in accordance with the invention is generally biodegradable. The rate of biodegradation of the membrane may be controlled by the selection of polyol units within the polymer. In general the biodegradability of polyurethane membrane will be dependent on type and proportion of polyol type or types used. The polyether-based polyurethanes are generally more resistant to biodegradation whereas the polyurethanes containing polyester polyol monomers are more readily degraded. The degradation rate generally increases with increasing polyester segment length and decreasing hard segment wt %. In addition polyurethanes derived from asymmetric aliphatic diisocyanates are generally degraded faster than those derived from symmetrical aliphatic or aromatic diisocyanates. This combination of factors may be used to tune the rate of degradation of the polyurethane membrane so as to match the period of effective membrane required for crop production.

In some cases membrane may be required only during establishment of crops over a relatively short period of two or three months. In other situations the membrane may be required for a more prolonged growing period in which case a lower rate of biodegradation is preferred. The biodegradation will generally be tailored to provide degraded polymer segments of average molecular weight (Mn) of 1,000-10,000. The biodegradability of polymers in soil is generally measured by monitoring the peak intensity of functional groups in the degraded membrane by IR, mass loss or molecular weight loss (Annals of Microbiology, 58 (3) 381-386 (2008) or by measuring the $CO_2$ emission from the soil under controlled conditions during degradation (Muller et al., 1992), Chemical Engineering Journal 142 (2008) 65-77.

The ionic polyurethane dispersion generally provides a membrane having elastomeric properties.

The polymeric membrane is required to possess good elasticity. The percentage elongation is in one set of embodiments >500. In one set of embodiments the ultimate tensile strength (UTS) >10 MPa. In a set of embodiments the Young's modulus <4.0 MPa. Of these properties, elasticity is one of the most important objectives as it will help improve membrane formation on rough soil surfaces and help hold soil particles together during soil movement resulting from a change in environmental conditions.

The composition comprises an aqueous dispersion of a polyurethane which generally comprises ionic groups. The weight ratio of polyurethane polymer to the total composition is in one set of embodiments in the range of from 20 to 55.

In a preferred embodiment the polyurethane is prepared from a prepolymer formed by reaction of a polyol and isocyanate. In this embodiment it is preferred that the prepolymer has a NCO to OH ratio in the range of from 1.0 to 1.1.

The membrane is applied to soil materials by spray application. In general, the membrane may be applied using spray equipment commonly used in agriculture in applying crop protection compositions. The polyurethane composition is generally applied to soil materials at a rate of 100 g to 1000 g polyurethane solids content per square meter of soil materials, preferably in the range of 100 g to 400 g, more preferably from 200 g to 300 g polyurethane solids content per square meter of soil materials.

The polyurethane may be applied to a surface area below the soil surface. The polyurethane may be applied prior to planting of seed or plants or after the planting of plants.

In one set of embodiments the polyurethane membrane is applied below the surface of the soil or on the surface of the soil using farming equipment such as machinery used in tillage and seeding of commercial food crops. For example in one embodiment the polyurethane composition is applied below the soil surface during seed placement. The polyurethane may be deployed before seed, together with seed or after seed. It may be contacted with seed during or after the deployment of seed. Alternatively the polyurethane dispersion may be applied to soil adjacent, such as directly covering the placed seed, using such a combination mechanical seeder which may be, for example, a gravity or pneumatically fed seeder. The polyurethane may be applied using an applicator attached to co-operate with a tilling implement to provide a membrane above and adjacent the placed seed. In one embodiment the seed and polyurethane dispersion are each contained in separate tanks each connected to feeder conduits for delivering contents to separate outlets behind the tilling implement. The seed delivery conduit delivers seed behind the tilling implement as the tilling implement moves forward to create a furrow in the ground surface. The seed emerging from the conduit outlet is deposited into the furrow. Gravity and/or a cooperating roller wheel may cause the furrow to collapse to a certain extent and the polyurethane emulsion outlet to the rear of seed outlet may deposit the polyurethane over the seed or the soil covering adjacent to the seed.

In a further embodiment the polyurethane membrane is applied to an area of soil prepared for crops such as vegetables and seedlings or seeds are planted into soil to which the membrane has been applied.

In a further set of embodiments the polyurethane spray composition comprises urea. The urea may be incorporated into the composition with the monomer reagents or may be mixed with the aqueous polyurethane dispersion. Commercial liquid urea compositions are available which may be mixed with the urethane dispersion. Generally, however, we have found that controlled release of urea fertiliser is achieved if the urea is incorporated with a monomer component such as a polyol monomer used in preparation of a prepolymer. Accordingly in one set of embodiments urea uniform granules <100 microns or powders is mixed with a polyol and isocyanate is reacted with the polyol in admixture with urea to form the prepolymer. The prepolymer may be reacted with a chain extender to provide the polyurethane without unduly affecting the polyurethane preparation. The incorporation of urea in this manner was found to provide good controlled release of nitrogen in the soil during use and degradation of the membrane and to allow application of the composition as a spray. Generally urea is present in a weight ratio of polyurethane to urea in the range of from 10:1 to 200:1. The urea may compromise the strength and useful life of the membrane if present in too great quantities but generally the amount of urea can be determined in accordance with the requirements for nitrogen supplementation and mulch life in specific circumstances. We have found that incorporation of the urea with a polyol doesn't compromise membrane strength and provides slow release in Example 2.

In one set of embodiments the thickening agents were used and consisted of biopolymeric compounds such as gelatin, alginate, wood meal, xanthan gum and polyacrylamide (PAM) cellulose. These materials were blended with the original polymer solution in different wt % which range from 1 to 20 wt % preferably 1-5 wt % and most preferably between 1-2 wt %. In a preferred set of embodiments the viscosity of the composition is no more than 200 milliPascal·second (mPa·s) and in a preferred set of embodiments the viscosity is in the range of from 50 to 200 mPa·s. The viscosity values were determined by using Brookfield DV-II+Programmable viscometer. The measurements were taken at room temperature (20-25° C.) using spindle No. 2 over different rotation speeds (rpm).

In one set of embodiments the polyurethane dispersion further comprises one or more additional dispersed polymers. Examples of additional dispersed polymers may be selected from the group consisting of non-ionic polyurethanes, acrylic polymers, polyvinyl acetate rubber latex, polysaccharides and gums. In one set of embodiments the polyurethane dispersion further comprises an acrylic polymer dispersed in the composition. In a further embodiment the polyurethane dispersion further comprises an anionic polysaccharide such as alginic acid or salt thereof.

The additional polymer or polymers may in one set of embodiments comprise in the range of from 3 to 50% by weight of the composition and the weight ratio of additional polymers to polyurethane may be in the range of from 1:1 to 3:1.

The polyurethane composition may comprise fillers, pigments or colouring agents. In one embodiment the polyurethane composition comprises a humate such as potassium humate. Potassium humates are available commercially including K-HUMATE S-90® (available from Omnia Specialties Australia Pty Ltd). In one set of embodiments the polymer solution is blended with the filler, particularly potassium humate, in a weight ratio of polyurethane polymer solution to filler in the range of from 1:0.01 to 1:0.1. The use of humate provides a black film on application to soil which is useful in increasing the temperature of the soil and promoting plant growth. The Black or dark brown colouring also of humates assist in the mulching function of the membrane by controlling growth of weeds and competition from other plants. Humates also have properties as fertiliser and plant growth stimulant and on degradation of the film provide soil conditioning.

The polyurethane compositions may also comprise silica like fillers such as fumed silicates exemplified by the Cab-O-Sil® M-5 product available from Multichem Pty Ltd. The silica filler is preferably used in a weight ratio of polyurethane polymer solution to filler in the range from 1:0.01 to 1:0.1. The higher number of surface silanol groups help in miscibility with water and increase the viscosity as well. The use of silicate provides hydrophobicity to films which is useful in reducing the water loss and promoting plant growth.

The polyurethane composition may be applied directly to soil and may be applied in a single or multiple applications such as one, two or three spray applications to the same area of soil. In soil which is particularly absorbent such as sandy soils the polyurethane may be drawn into the soil and form a less effective membrane. In such cases multiple applications may be useful. In one set of embodiments, which may be particularly useful in sandy soils, the polyurethane dispersion is applied following application of a primer adapted to reduce wicking of the polyurethane into the soil.

Useful primer layers may include one or more materials selected from the group consisting of anionic polysaccharides such as alginate salts.

The polyurethane composition may comprise one or more additives such as dyes, fillers and agrochemicals. Examples of agrochemicals may include pesticides, plant growth regulators and plant nutrients. The incorporation of such additives may allow their controlled release to the soil or immediate growing environment of the plants from the membrane during crop production. In one embodiment at least one of the dyes, fillers and additional agrochemical is included with a urea additive as hereinbefore described. The additive may be sorbed onto the urea or other solid carrier material or may be added during or after the preparation of the polyurethane composition.

Pesticides may include one or more selected from the group consisting of herbicides, insecticides, fungicides, nematodicides and molluscicides.

Examples of herbicides which may be included may be selected from the group consisting of FOPs, DIMs, sulfonyl ureas, synthetic auxins, dinitroanilines and quinolone carboxylic acids.

Examples of insecticides include carbamates, triazemates, organophosphates, cyclodiene organochlorines, fiproles, methoxychlor, pyrethroids, pyrethrins, neonicotinoids, nicotine, spinosyns, Bt, benzoylureas and the like.

Examples of fungicides include metalaxyl, mefenoxam, azoxystrobin captan, thiabendazole, fludiaxonil, thiram, PCNB, potassium bicarbonate, copper fungicides and *Bacillus subtilis*.

Examples of nematodicides include, avermectins, carbamates, oxime carbamates, organophosphorus nematodicides.

The membrane of the invention may allow continuous release to provide or supplement plant protection during the growing season and reduce or eliminate the need for additional use of agrochemicals.

The composition may be applied to any of a wide range of soil formations used in agriculture such as raised beds, pastures, ridges, furrows and irrigation channels, The invention is useful on a wide range of soil types and soil classifications such as referred to in the World Reference Base of Soil Resources.

The invention will now be described with reference to the following examples. It is to be understood that the examples are provided by way of illustration of the invention and that they are in no way limiting to the scope of the invention.

EXAMPLES

Brief Description of Drawings

Examples of the invention are described with reference to the attached drawings.

In the drawings.

POLYMER SPRAYABLE FORMULATION

Figure 1:
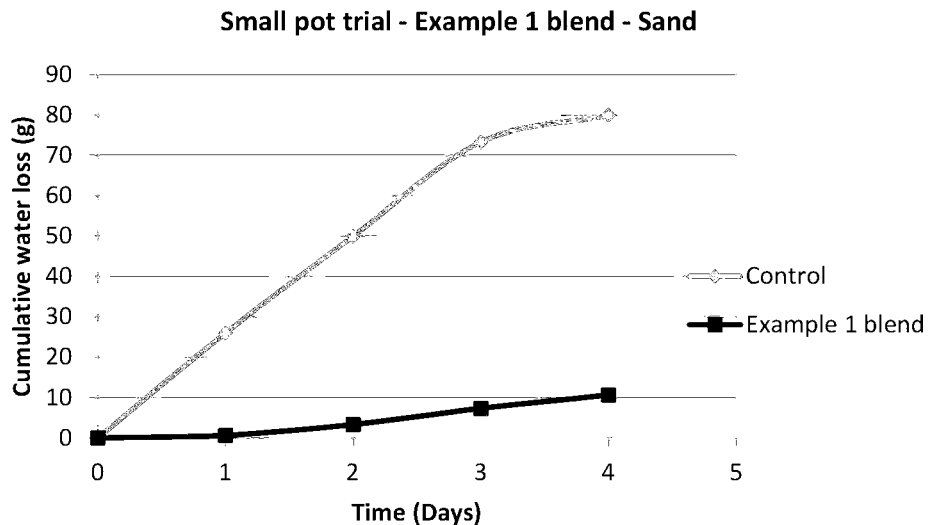
FIG. 1 is a graph showing the cumulative water loss of the polymer of Example 1 applied to sandy soil as a spray in and mixture with raw latex and alginate in a weight ratio PU (Example 1):raw latex:alginate of 3:1:0.5 in accordance with Example 6.

The following polyurethane sprayable membranes may be prepared using the general procedures outlined below.

ABBREVIATIONS

BMPA: 2,2-Bis(hydroxymethyl)propioninc acid
DTAB: n-Dodecyltrimethylammoniumbromide EDA=Ethylenediamine
BDO=1,4-butane diol
MDEA—N-methyldiethanol amine
PUU—Polyurethaneurea
PU=Polyurethane
Latex (Natural both crosslinked and Raw)
PPG=Polyproylene glycol
IPDI—Isophorone diisocyanate
PDMS=Polydimethylsiloxane polyol (Carbinol)
SDDS=Sodium dodecyl sulfate
AcOH=Glacial Acetic acid
DBTL=Dibutyltin dilaurate
PP=Prepolymer
SS=Soft segment
HS=Hard segment
CE=Chain extender
SCMC: Sodium salt Carbomethoxy cellulose
DICAP®2020 Polyester polyol
DMPA® polyol HA-0135

Test Procedure

Particle size was measured by Wyatt Dyna Pro Plate Reader Wyatt Technology Corporation, 6300 Hollister Ave, Santa Barbara, Calif. 93117-3253. The viscosity of polymer solution was measured by Brookfield digital rotary viscometer, model 94800-0. GPC measurements of other polymers were performed on a Shimadzu system equipped with a CMB-20A controller system, a SIL-20A HT autosampler, a LC-20AT tandem pump system, a DGU-20A degasser unit, a CTO-20AC column oven, a RDI-10A refractive index detector and with 4 Waters Styragel columns (2*HT3, HT4, HT5 each 300×7.8 mm) providing an effective molar mass range of 100-4×10$^6$) and with N,N-dimethylacetamide (DMAc) containing 2.1 g·L$^{-1}$ of lithium chloride (LiCl) as eluent with a flow rate of 1 mL·min$^{-1}$ at 80° C. The molar masses in poly(methyl methacrylate) (PMMA) equivalents were obtained from a calibration curve constructed with low dispersity PMMA standards (Polymer Laboratories). A third-order polynomial was used to fit the log $M_p$ versus time calibration curve, which was approximately linear across the molar mass range from 1,020 to 1,944,00 g·mol$^{-1}$.

DSC was performed on a Mettler Toledo DSC821 using samples (~5 mg weight) at a heating rate of 10° C./min under nitrogen purge. The samples were stored for 48 h under a vacuum at room temperature (RT) (0.1 Torr) prior to analysis. Tensile testing was performed on an Instron Model 4468 universal testing machine following the ASTM D 882-02 test method at ambient temperature (23° C.) with a humidity of around 55%.

Materials

Natural latex rubber (water emulsified, "Sprayable Latex" with 40.2% solids content was received from Barnes, Sydney).

Sodium Alginate was received as powder from Melbourne Food Depot, Victoria.

DICAP®2020 Polyester polyol and DMPA® polyol HA-0135 were received from GEP Specialty Chemicals and used after degassing and drying under standard procedure.

Polymers—as Synthesised.

General Method of Synthesis

Polyol and CE were degassed and dried under vacuum prior to use.

Polymerisation reactions may be carried out by two step method in a $N_2$ atmosphere in a constant-temperature oil bath using 250-mL round-bottom flask fitted with mechanical stirrer, thermometer, and condenser. PU reaction may be carried out by modified one step method.

One Step Method

Diisocyanate (IPDI) was weighed into a three neck RB flask equipped with overhead mechanical stirrer, dropping funnel and nitrogen inlet. A required amount of degassed polyol, diol chain extender, appropriate ionomer and DBTL catalyst (0.1 wt %) were added to the IPDI. The reaction was heated at 80° C. for 1 h and later at 90° C. for 2 h. The reaction mixture was then cooled down to 60° C. and the viscosity-reducing agent acetone and the neutralizer acid or base were subsequently added under stirring. After 30 mins, the reaction mixture was further cooled down to sub ambient temperature and deionised water containing surfactant was added to obtain a water dispersible polymer emulsion.

Two-Step Method

Appropriate amount of diisocyanate (IPDI) was weighed into a three neck RB flask equipped with overhead mechanical stirrer, dropping funnel and nitrogen inlet. The flask was heated in an oil bath at 70° C. The appropriate amount of degassed polyol was then added to IPDI. DBTL catalyst (0.1 wt %) was added to the reaction mixture after few minutes. The reaction mixture was then heated at 80° C. for 2 h. Pre-dried BMPA dissolved in anhydrous NMP solvent and added to the above pre-polymer quickly and reaction continued another 2 h at 90° C. The flask was then cooled down to 60° C. and with appropriate acid or base for 30 mins. The reaction mixture further cooled down to sub-ambient temperature and deionised water containing appropriate surfactant was added to obtain an emulsified prepolymer solution. Accurately weighed amine CE diluted in deionised water was added drop wise to this solution and stirring continued until NCO peak disappeared. The water dispersible polymer emulsion was then transferred to a screw tight container under nitrogen atmosphere and stored at ambient temperature. Other experiments with PUU index 1.01 and 1.03 were carried out under similar conditions.

Example 1: Anionic Polymer

A mixture of PPG (MW 1000, 20.00 g) was degassed at 80° C. for 2 h under vacuum (0.1 torr). IPDI (8.22 g) was weighed into a three neck flask equipped with mechanical stirrer, dropping funnel and nitrogen inlet. The degassed polyol (10.0 g) was then added to IPDI followed by DBTL catalyst (0.03 g) and the flask was heated at 80° C. for 1 h with stirring. Pre-dried BMPA (0.43 g) dissolved in minimum amount of anhydrous NMP was added to the above pre-polymer quickly and reacted for another 2 h at the 90° C. The flask was cooled down to 60° C. and anhydrous Triethylamine (0.324 g) was added and reacted for 30 mins. The flask was further cooled down to 0° C. using an ice cold bath. Deionised water (44.0 mL) containing 2 wt % SDDS was added to this pre-cooled prepolymer mixture and was stirred vigorously to yield an emulsified opaque solution. Chain extension agent EDA (0.765 g) was then added drop wise to this solution and stirring continued for 30 mins. The reaction flask was later warmed to 25° C. and the stirring continued until the NCO peak disappeared. The low viscous stable water dispersible polymer emulsion thus obtained was stored in an air tight container at ambient temperature. The polymer showed an average particle size distribution of 425±53 nm with a viscosity of 625 mPa·s. The molecular weight of polymer was $M_n$=117138, $M_w$=699278 and PD=2.5.

All other example's subsequent formulations also contained water containing 2-wt % SDDS surfactant.

The above polymer solution can be crosslinked using 1-20% calcium chloride solution. The crosslinking is preferably carried out by spraying the calcium chloride solution on the soil bed prior to spraying PU solution.

The polymer showed good membrane forming properties post spray on sandy soil at room temperature.

Example 2: Example 1 with Urea Powder

The degassed polyol (20.0 g) was weighed into a three neck flask equipped with mechanical stirrer, dropping funnel and nitrogen inlet. Urea powder (0.6 g) was then added to the flask and stirred along with polyol at 70° C. for few mins. IPDI (8.22 g) was added into polyol and urea mixture followed by DBTL catalyst (0.030 g). After the addition, the reaction mixture was heated at 80° C. for 1 h with stirring under nitrogen. Pre-dried BMPA (0.43 g) dissolved in minimum amount of an anhydrous NMP was added to the above pre-polymer quickly and reacted for another 2 h at 90° C. The flask was cooled down to 60° C. and anhydrous Triethylamine (0.324 g) was added and reaction continued for 30 mins. The flask was further cooled down to 0° C. using an ice bath. Deionised water (44.0 mL) containing 2 wt % SDDS was quickly added to this pre-cooled prepolymer mixture and was stirred vigorously to yield an emulsified opaque solution. Chain extension agent EDA (0.765 g) was added drop wise to this solution and stirring continued for 30 mins. The reaction flask was later warmed to 25° C. and the stirring continued until NCO peak disappeared. The low viscous stable aqueous dispersion of polyurethanes thus obtained was stored in an air tight container at ambient temperature. The polymer showed an average particle size distribution of 333±110 nm with a viscosity of 222 mPa·s.

The water dispersible polymer emulsion showed good membrane forming properties post spray on sandy soil at room temperature under controlled laboratory conditions.

Example 3: Example 1—Higher HS (Hard Segment of Polymer)

The synthesis procedure was identical to Example 1. The amounts of precursors used are as follows:
IPDI=12.04 g, PPG=20.0 g, BMPA=0.87 g, Triethylamine=0.65 g, Deionised water=44.0 mL, EDA=1.57 g The emulsified polymer solution showed good membrane forming properties post spray on sandy soil at room temperature and showed number molecular weight $M_n$=52411, and PD=2.2.

Example 4: Cationic Polymer

IPDI (11.29 g) was weighed into a three neck flask equipped with mechanical stirrer, dropping funnel and nitrogen inlet. The degassed polyol PPG (20.0 g) and MDEA (3.14 g) and catalyst DBTL (0.1 wt %) were then added and the reaction continued for 1 h at 80° C. and 2 h at 90° C. The flask was cooled down to 60° C. temperature and glacial acetic acid (1.58 g) was added through a syringe and reaction continued for 30 mins. Anhydrous acetone (25.0 mL) was then added to polymeric mixture as a viscosity reducing agent and flask was cooled down to 0° C. using an ice cold bath. Deionised water (44.0 mL) containing 2 wt % n-Dodecyltrimethylammoniumbromide (DTAB) was added to this pre-cooled prepolymer mixture and was stirred to yield an emulsified opaque solution. Chain extension agent EDA (0.05 g) diluted in deionised water was added dropwise to this solution. After the addition, the flask temperature was warmed to 25° C. and stirring continued until NCO peak disappeared. The acetone was later removed and PUU emulsion was stored at ambient temperature.

The water dispersible polymer emulsion showed good membrane forming properties post spray on loam soil.

Example 5: Pot Trial

General Procedure for Preparing Polymer Blend

For small volumes of PU blends, material, accurately weighed (+/−0.1 g), was placed in a 100.0 mL Schott bottle and shaken vigorously for 30 seconds. The order was PU, latex, alginate. For larger quantities used in field trials, the same order was used and stirring carried out by use of a paddle or shaken in 5 L plastic containers.

Various PU blends in different ratios with latex, with and without alginate, were prepared using this method.

Method

Small pot trials to determine soil water evaporation were carried out using metal pots with wire mesh bottoms which are packed with soil. (The pots are 105 mm diameter and 50 mm deep—soil is packed into the pot to a height of approximately 45 mm). Three types of soil have been trialled; sand, loam and clay. The surface of the soils are damped down with mist-sprayed water ~5 g per pot using a 'mask' to ensure the spray lands on the soil rather than the container. This is allowed to dry off overnight. The experimental PU is sprayed onto the pot surface using a 'mask' and allowed to membrane form overnight. Treated pots are immersed in ~2 cm of water allowing water to wick up and into the pot through the wire mesh—an untreated pot with the same soil is used to time the immersion. Pots are placed on electronic balances in a conditioned atmosphere room set at 30° C. and 40% Relative Humidity (RH). The time of trial varies from 4 to 10 days depending on the rate of evaporation.

Example 6

Pot Trial of Polymer: Example 1: Raw Latex:Alginate (3:1:0.5) Blends on Sandy Soil The elastic water-based polyurethane blend was examined for water barrier properties on small pot trials. The formulation comprised of the Polymer composition of Example 1 with raw latex and alginate (2.5% solution) in the ratio—3:1:0.5, showed significantly less water loss compared to control as shown in FIG. 1.

Example 7

Pot Trial of Polymer: Example 1 on Different Soils

Changes were made in carrying out laboratory trials with Loam and Clay soils to overcome soil cracking and pulling away from the side of pots to get consistent results. The method consists of crushing the dry soils to prepare a relatively flat surface and mist spraying with water. The pots were then allowed to dry overnight. This produced a soil with a closer representation of soils found in fields.

Figure 2:
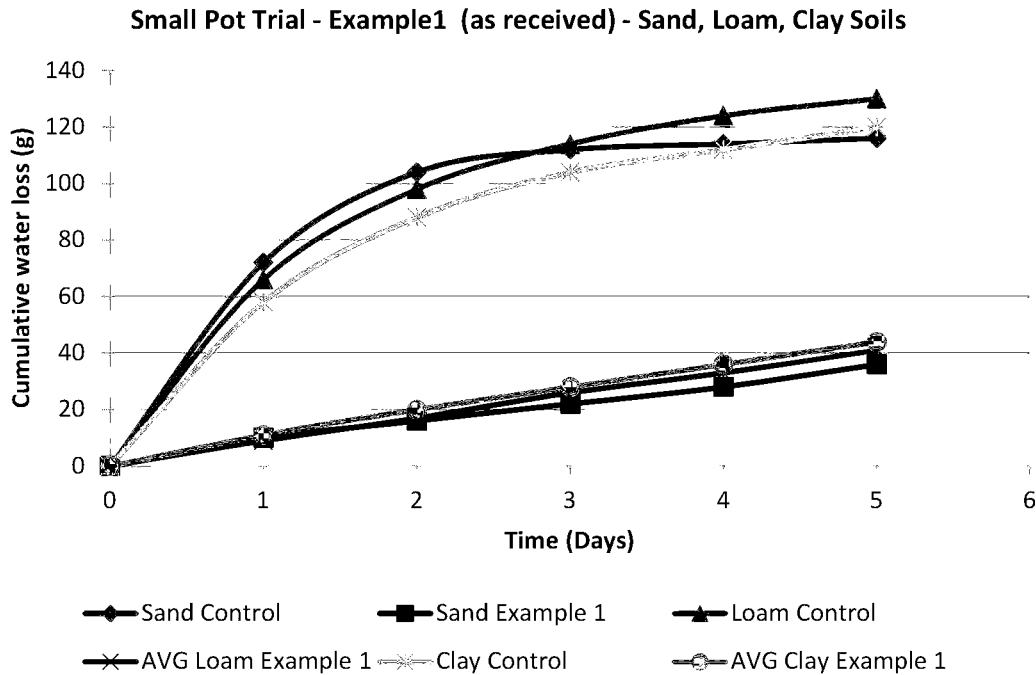
FIG. 2 is a graph showing the cumulative water loss with time for the polymer of Example 1 sprayed onto soils in the form of sand, loam and clay, as described in Example 7.

Polymer (Example 1) alone was sprayed onto small pot trials with the above mentioned soil conditioning. Sand, loam and clay soils were trialled and the results are plotted in the graph presented as FIG. 2 in the drawings.

Polymer (Example 1) alone was tested in small pot trials with the above mentioned soil conditioning using aqueous 2% $CaCl_2$ solution crosslinker as a primer.

Example 1 was also trialled on a primer of cross-linked Alginate.

Example 8

Pot Trial of Cationic Polymer (Example 4)

Figure 3:
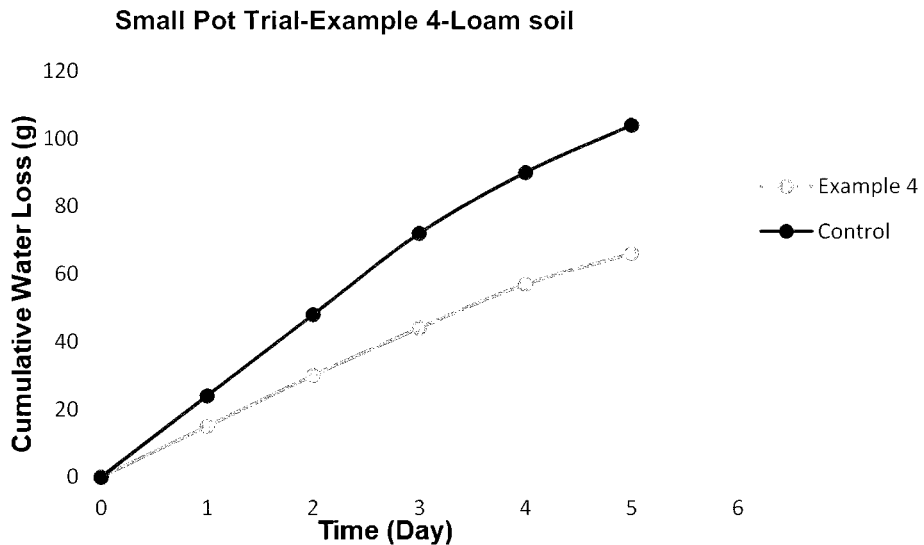
FIG. 3 is a graph comparing the cumulative water loss with time from loam soil sprayed with the polymer of Example 4, as described in Example 8. The upper plot relates to the control and the lower plot to the Example 4 polymer.

Polymer (Example 4) alone was sprayed onto small pot trials with the above mentioned soil conditioning on loam soil. The polymer provided 30% water reduction as shown in FIG. 3 of the drawings.

Example 9: Example 1, with Humus Coal

The polymer solution prepared in Example 1 was mixed with 5 wt % solution of K-hamate-S90 in different ratio by gentle agitation at ambient temperature. The emulsified black polymer solution showed good film forming properties post spray on sandy soil at room temperature.

Example 10 (a): Example 1, with Viscosity Modifier Xanthan

The polymer solution prepared in Example 1 was mixed with 2% Xanthan solution in various ratios (Table 1) by vigorous agitation for several minutes at ambient temperature. The emulsified polymer solution showed an increased viscosity and was sprayable. The polymer, upon spray, showed good film forming properties post spray on sandy soil at room temperature.

Example 10 (b) Example 1, with Viscosity Modifier Gelatine

Figure 4:
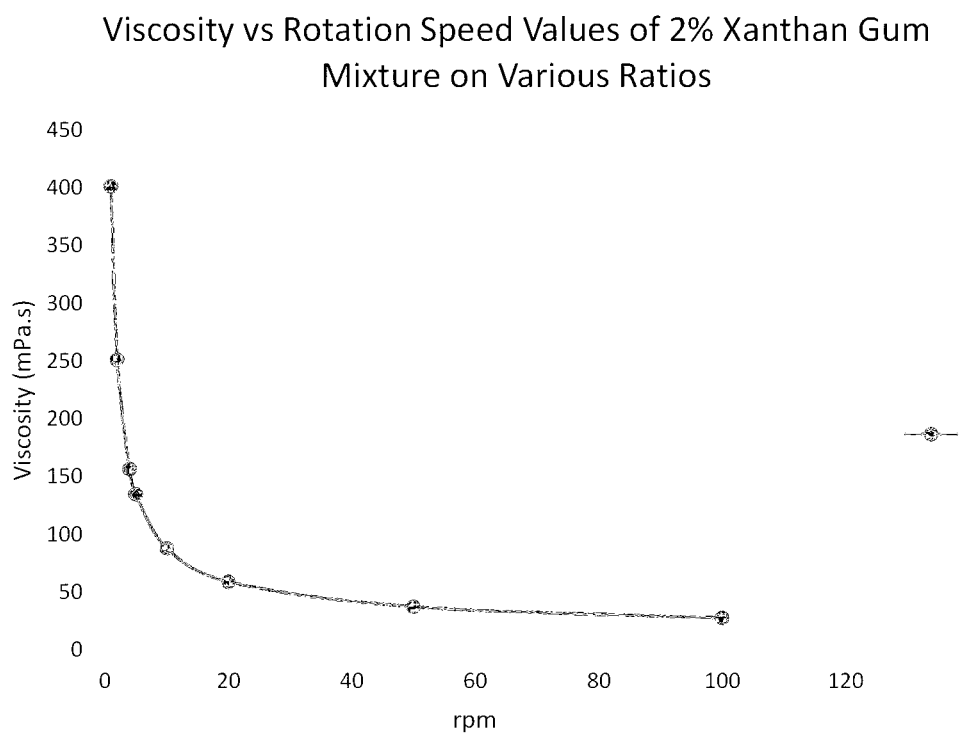
FIG. 4 is a graph showing the variation in viscosity with rotation speed described in Example 10 (b). The upper plot relates to the ratio of 1:0.1 the second from top plot to 1:0.05 and the lower plot to 1:0.01 as described in Example 10 (b).

The polymer solution prepared in Example 1 was mixed with 2% Gelatine solution in various ratio (Table 2) by vigorous agitation for several minutes. The emulsified polymer solution showed an increased viscosity as shown in FIG. 4 and was sprayable. The polymer, upon spray, showed good film forming properties post spray with minimum wicking on sandy soil at room temperature compared to control (Table 2).

It was found that the concentration of Gelatine gum mixture decreased with increasing value of spindle's rotation speed. Also, when higher ratio of xanthan gum to polymer was used, greater viscosity values were observed.

Example 10 (c): Example 1, with Viscosity Modifier Alginate

The polymer solution prepared in Example 1 was mixed with 2-8% Alginate solution in various ratios (Table 3) by vigorous agitation for several minutes at ambient temperature. The emulsified polymer solution showed an increased viscosity and was sprayable. The polymer, upon spray, showed good film forming properties post spray on sandy soil at room temperature.

Example 10 (d): Example 1, with Viscosity Modifier Polyacrylamide

The polymer solution prepared in Example 1 was mixed with 2% polyacrylamide solution in various ratios (Table 4) by vigorous agitation for several minutes at ambient temperature. The emulsified polymer solution showed an increased viscosity and was sprayable. The polymer, upon spray, showed good film forming properties film post spray on sandy soil at room temperature.

TABLE 1

Wicking experiment and sprayability test results of Example 1 and xanthan gum mixtures

| Xanthan Gum Conc. (wt/wt) | Example 1 comp.with: Xanthan Gum) | Wicking | Sprayability |
|---|---|---|---|
| 2% | 1:0.01 | 1.5 cm | Sprayable |
|  | 1:0.05 | 1 cm | Sprayable |
|  | 1:0.1 | 0.2 cm | Sprayable |
|  | 1:1 | — | Unsprayable |
|  |  | 2.2 cm | Sprayable |

Likewise other viscosity modifiers showed similar results when mixed in different ratios with the Example 1. A comparison of different viscosity modifiers Gelatine, Alginate and PAM with Example 1 are summarised in Tables 2, 3 and 4 below.

TABLE 2

| Gelatine Conc. (wt/wt) | Example 1 comp. with: Gelatine) | Wicking | Sprayability 10 |
|---|---|---|---|
| 2% | 1:0.01 | 2.2 cm | Sprayable |
|  | 1:0.1 | 2 cm | Sprayable |
|  | 1:1 | 1.3 cm | Sprayable |

TABLE 3

| Alginate Conc. (wt/wt) | Example 1 comp with: Alginate | Wicking | Sprayability |
|---|---|---|---|
| 2% | 1:0.1 | 2 cm | Sprayable |
|  | 1:0.75 | 1.5 cm | Sprayable |
|  | 1:1 | 1 cm | Sprayable |

TABLE 4

| PAM Conc. (wt/wt) | Example 1 comp. with: PAM | Wicking | Sprayability |
|---|---|---|---|
| 2% | 1:0.01 | 1 cm | Sprayable |
|  | 1:0.05 | 0.3 cm | Sprayable |
|  | 1:0.1 | — | Unsprayable |
|  | 1:1 | — | Unsprayable |

Example 11: Example 1 with 64 wt % HS, PPG MW 974.2

The synthesis procedure was identical to Example 1. The amounts of precursors used are as follows;

IPDI=13.87 g, PPG=10.0 g, BMPA=1.397, Triethylamine=1.05 g, Deionised water=41.0 g, EDA=2.50 g The emulsified polymer solution showed good film forming properties post spray on sandy soil at room temperature and showed number molecular weight $M_n$=52411, and PD=2.2

Example 12: Example 1 Prepared with PCL, MW 916.77

The synthesis procedure was identical to Example 1. The amounts of precursors used are as follows:

IPDI=16.53 g, PCL=40.0.0 g, BMPA=0.822 g, Triethylamine=0.69 g, Deionised water=88.20 g, EDA=1.47 g The emulsified polymer solution showed good film forming properties post spray on sandy soil at room temperature and showed number molecular weight $M_n$=52411, and PD=2.2

Example 12a: Polymer Example 12: Raw Latex:Alginate (3:1:0.5) Blends

The blend formulation of Example 12 with Raw latex and Alginate was prepared as described in Example 6.

Example 12b

The composition of Example 12 was mixed with 5 wt % solution of K-humate-S90 in different ratios by gentle agitation at ambient temperature. The emulsified black polymer solution showed good film forming properties post spray on sandy soil at room temperature.

Example 13: Example 12 with 25 wt % HS

The synthesis procedure was identical to Example 1. The amounts of precursors used are as follows; IPDI=12.42 g, PCL=40.0 g, BMPA=0.327, Triethylamine=0.248 g, EDA=0.586 g, Deionized water 80.0 g.

Example 14: Example 1 with Mixed Polyol

The process of Example 1 was repeated with a mixed polyol PPG and PPL.

The synthesis was carried out using blends of both PPG and PCL in 1:1 ratio with same HS wt % composition. The emulsified polymer solution showed good film forming properties post spray on sandy soil at room temperature.

Example 15: Example 1 with DICAP Polyol, MW 1100

The synthesis procedure was identical to Example 1. The amounts of precursors used are as follows; IPDI=16.23, DICAP=40.0.0 g, BMPA=0.927 g, Triethylamine=0.699, EDA=1.66 g, Deionized water 100.0 g. The emulsified polymer solution showed good film forming properties post spray on sandy soil at room temperature.

Example 16: Example 12 with DICAP and PCL Polyol Blends

The synthesis of Example 12 was carried out using blends of both PCL and DICAP in 1:1 ratio under identical conditions. The emulsified polymer solution showed good film forming properties film post spray on sandy soil at room temperature.

Example 17: DMPA Polyol, MW 1934

The synthesis procedure was identical to Example 1 with 25% HS. The amounts of precursors used are as follows:
IPDI=11.21, DMPA=40.0 g, BMPA=0.759 g, Triethylamine=0.759, EDA=1.361 g, Deionized water=80.0 mL The emulsified polymer solution showed good film forming properties film post spray on sandy soil at room temperature.

Example 18: Water Flow Trial on Soil Stabilised with Composition of Example 1

Simulating Stability of Soil in Flood Irrigation Furrows.

Flood irrigation via furrowed beds has an inherent problem of uneven distribution of water which can lead to waste. If the soil were stabilised with CSIRO PU, this would in theory give a surface that would allow irrigation water to move more rapidly to the end of the furrow and allow water to be absorbed into the soil of the ridge (see FIG. 6) at a more even rate. This would improve water distribution in the crop root zone and reduce unwanted deep drainage.

PVC plumbing tubes (15 cm diam.) used to simulate furrows. Tubes cut in half length ways (giving two test troughs) and silicone sealant baffles made onto inner surfaces (to stop soil slippage). Loam soil (Hanwood loam) packed into tubing (wet clay like) followed by sandy loam—assemblies placed outdoors for a week in the rain to stabilise the soil—to give cohesive strength to soil. One trough was sprayed with the composition of Example 12 with modifier. Both troughs were supported at one end to give a slope of 1 in 33 (approximately 3%). Water was supplied via a 1 L separation funnel with a tap to release water. Once released, the time of flow was measured and treated trough showed much reduce time 13 seconds compared to untreated trough which took 23 seconds.

Example 19: Pot Trials Using Example 1 with Different Viscosity Modifiers (Example 10 b, c and d)

Figure 5:
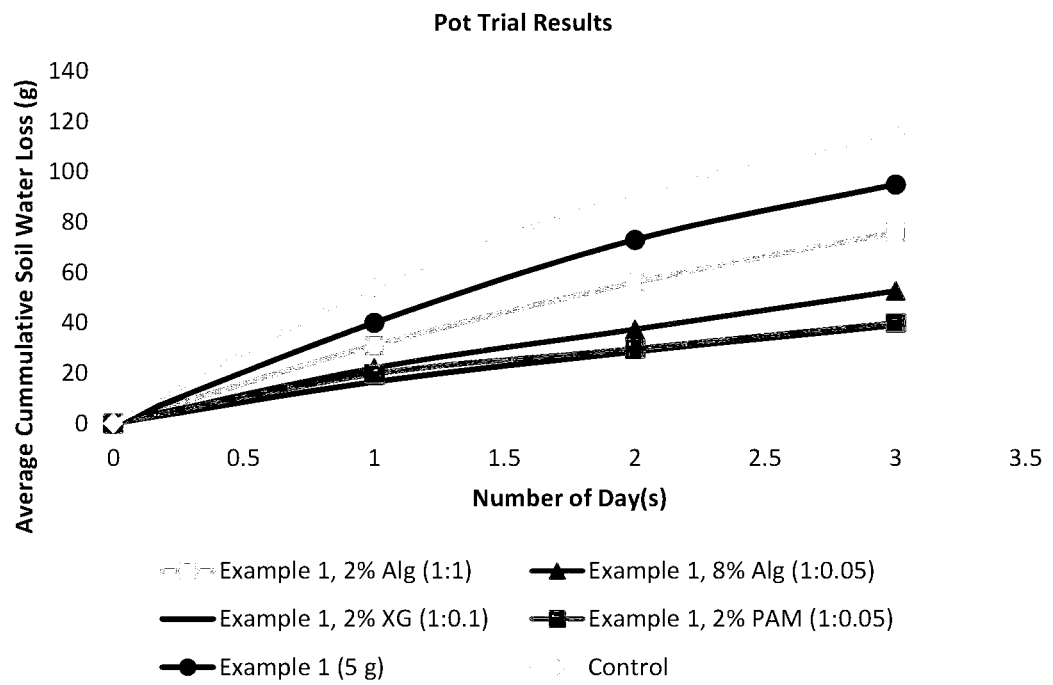
FIG. 5 is a graph showing the cumulative soil water loss with time for soil to which a spray of various polymers has been applied as described in Example 19. The top plot relates to the control. The second from top to Example 1 (5 g), the third from top to 2% Alg (alginate), the fourth from top the 8% Alg, the fifth from top 2% PAM and the bottom plot 2% XG (xanthan gum).

The composition corresponding to Example 10 (b, c and d) were prepared containing various viscosity modifiers as shown in Table 5 and were then sprayed onto soil surface in pot trials following standard pot trial method to measure cumulative moisture loss. The spraying quantity was about 5-6 g of the mixture and the results are summarised in FIG. 5

TABLE 5

| Trial reference | Viscosity modifier | Amount (% w/w) |
| --- | --- | --- |
| (a) | alginate | 2 |
| (b) | alginate | 8 |
| (c) | Xanthan gum | 2 |
| (d) | PAM | 2 |

Example 20

Field Trial
Design and Layout

Two crops were examined, rockmelon and sorgum and the rockmelon trial was conducted twice to confirm results.

Figure 6:
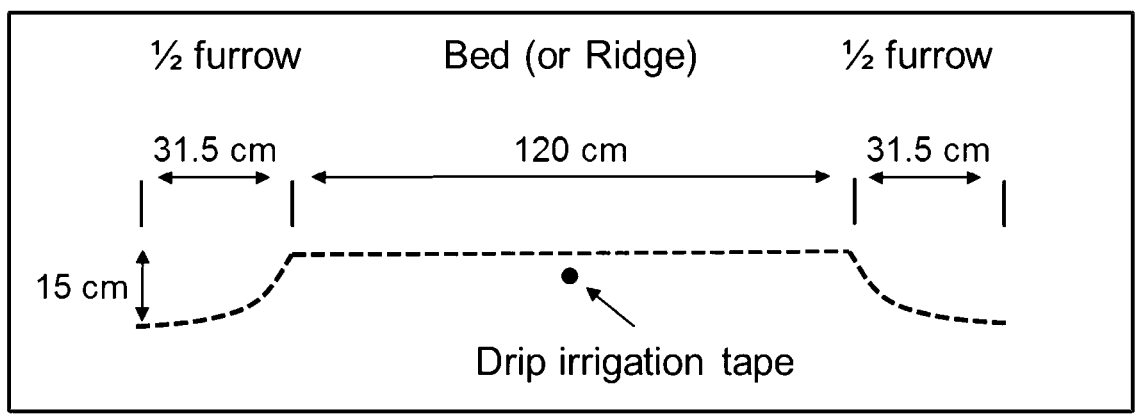
FIG. 6 is a schematic drawing showing the furrow and irrigation pattern used in conducting the field trial referred to in Example 20.

Each field trial involved a series of six 30×1.2 m beds. Three treatments were implemented for each trial—a control using standard irrigation practice with no polymer, a polymer treatment with the polymer composition of Example 12 applied at the rate of 1 kg/m² on beds with irrigation reduced from the standard practice to provide 28% less water than the control, and a second control treatment with no polymer that received the same irrigation as the polymer treatment. All treatments were irrigated using drip irrigation with the volume of water applied measured by flow meters installed on the drip manifolds. The soil type was a loam with a surface bulk density of 1500 kg/m³. Particle size distribution was 22% Clay, 6% Silt, 62% fine sand and 10% course sand in the 0-0.1 m depth range. Configuration of the furrow and bed system is shown in FIG. 6. The bed or ridge was 120 cm wide with a drip irrigation tape a few centimetres below the soil surface. The mid furrow to mid furrow spacing was 1.83 m. Application of the polymer was applied to the total area of the bed for the polymer treatments.

Results:

TABLE 6

Example 6, Trial 1: Rockmelons
22-32% improvement in water use productivity

| Treatment | Water applied (ML/ha) | Ave Yield t/ha | Yield as a % of the control | Water use productivity (t/ML) | Increase in water productivity over control |
|---|---|---|---|---|---|
| Control (Full Irrigation) | 4.11 | 58.6 | 100% | 14.26 | |
| Polymer | 2.98 | 56.0 | 96% | 18.79 | 32% |
| Control #2 (Same water as polymer) | 2.98 | 45.8 | 78% | 15.37 | |

TABLE 7

Example 6. Trial 2: Rockmelons
18-22% improvement in water use productivity

| Treatment | Water applied (ML/ha) | Ave Yield (t/ha) | Yield as a % of the control | Water use productivity (t/ML) | Increase in water productivity over control |
|---|---|---|---|---|---|
| Control (Full Irrigation) | 4.95 | 40.3 | 100% | 8.14 | |
| Polymer | 3.52 | 35.1 | 87% | 9.97 | 22% |
| Control #2 (Same water as polymer) | 3.52 | 29.7 | 74% | 8.44 | |

TABLE 8

Example 12a Sorghum
15-34% improvement in water use productivity

| Treatment | Water applied (ML/ha) | Ave Yield (t/ha) | Yield as a % of the control | Water use productivity (t/ML) | Increase in water productivity over control |
|---|---|---|---|---|---|
| Control (Full Irrigation) | 3.05 | 24.7 | 100% | 8.10 | |
| Polymer | 1.76 | 19.1 | 77% | 10.85 | 34% |
| Control #2 (Same water as polymer) | 1.76 | 16.6 | 67% | 9.43 | |

Example 21

Properties of Polymer Formulation Example 1 and Example 12:

The mechanical properties of polymer examples are dependent upon specific formulation, HS content and polyol types. Example 1 and 12 polymers showed UTS in the range of 8-15 MPa and elongation at break between 1100-1500%.

The particle size and contact angle of the polymers of Examples 1 and 12 were determined and are reported in Tables 9 and 10.

TABLE 9

Particle size

| Sample Code | Particle size | % Elongation |
|---|---|---|
| Example 12 | 207 ± 45 | 1852 ± 31 |
| Example 12b | 205 ± 55 | 1477 ± 67 |
| Example 12b | 223 ± 98 | 1321 ± 104 |

TABLE 10

Contact angle of cured films

| Sample Code | Contact angle (θ) |
|---|---|
| Example 1 | 63 ± 4 |
| Example 10d with xanthan gum (2%) | 60 ± 11 |
| Example 1 + SCMS | 93 ± 8 |

Example 22: Weed Control Using the Composition of Example 1

The invention can be pigmented without adversely affecting the subsequent membrane. In this example black pigmented and unpigmented PU were trialled to suppress weed growth using lawn seed to simulate weeds. Hortico™ lawn seed with a 70% germination guarantee was used in Debco™ seed raising mix. The lawn seed, 3 grams, was evenly distributed across seed trays, 33×27 cm in area, The base formulation used was Example 1 with SCMC (at 2.5% on wt of PU based on a 7.4% stock solution). Two spray formulations trialled (in triplicate): Example 1 with SCMC and Example 1/SCMC with 3% (wt/wt) black pigment acrylic paint and a doughnut shaped stencil was used to produce a non-treated section for watering from the top. An analysis of seed growth after 16 days assessed the total growth area of germinated lawn seeds as a percentage of total tray area for both spray treatments and pigmented PU spray showed significantly less weed growth 11.4±2.1 compared to unpigmented composition of Example 1, 20.9±0.8% and showed that black pigmented membrane acts as a weed growth suppressant when compared directly with an un-pigmented spray formulation.

Example 23: Biodegradation

Biodegradation testing is carried out for films formed of the composition of Example 1 and the composition of Example 12 by adding the films to a respirometer containing soil and allowing to stand over a period of time during which the amount of carbon dioxide evolved is determined. The level of biodegradation is expressed in percent is determined by comparing the amount of carbon dioxide evolved with the theoretical amount.

Figure 7:
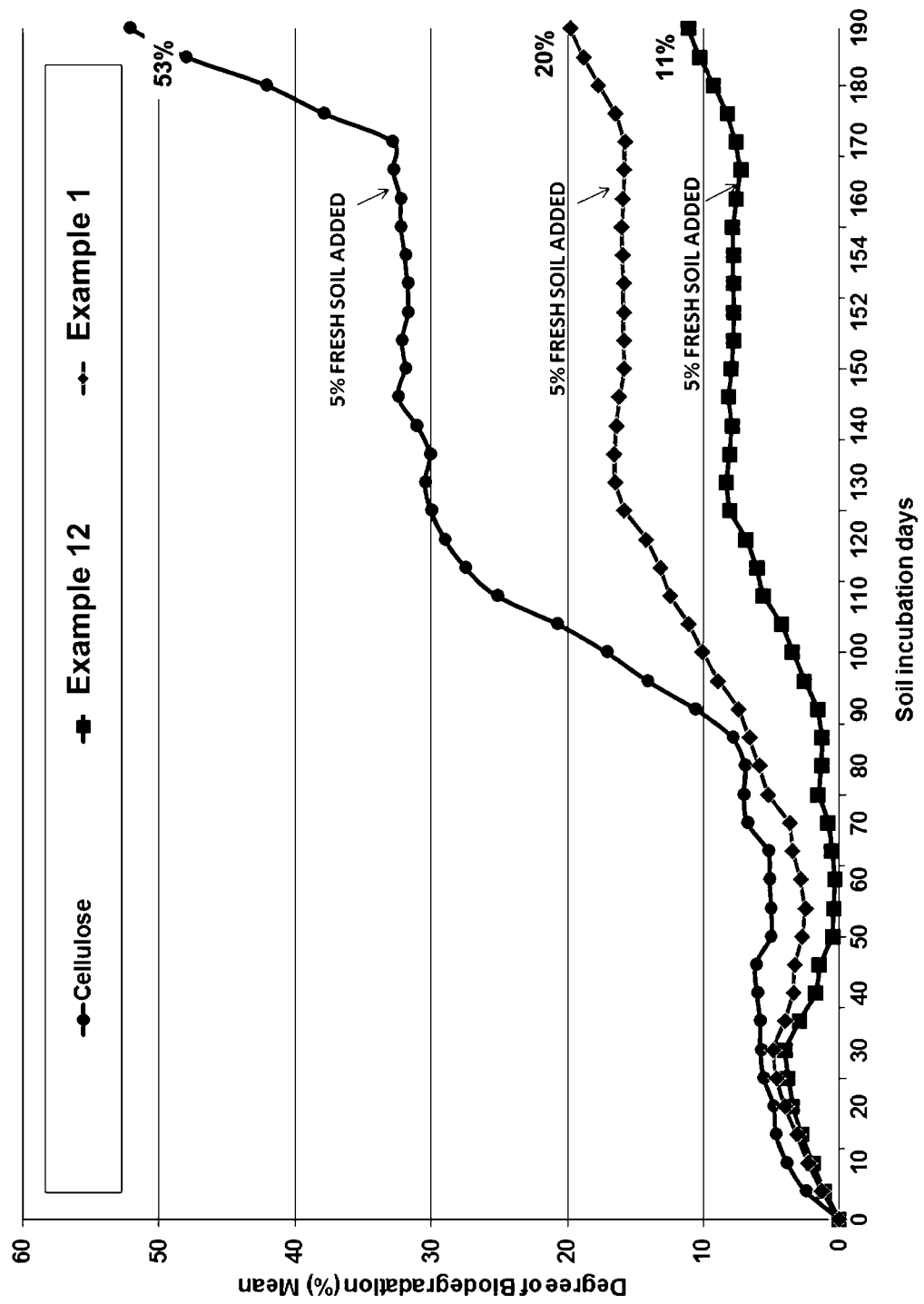
FIG. 7 is a graph showing biodegradation results from the trial reported in Example 23.

The test specimens used are in the form of approx. 150 micron thick film strips with the size 2 cm×2 cm, Approximately 4.0 g of test materials (dry weight basis) are mixed with 200 g of soil (dry weight basis) and filled in the glass reactor. The glass reactors are placed in respirometric unit maintained at 28° C.±2° C. for the test period. Test mixture (soil/soil and test material) in each bioreactor is continuously aerated with CO2 free humidified air and rehydrated as required. The amount of carbon dioxide evolved is measured at regular intervals (every 6 hours) using an infra-red CO2 analyser. At the end of the test, the residual materials are extracted from the soil and assessed for properties such as weight loss, MWs, level of oxidation, weight loss and % biodegradation. The water content of the soil is kept between 40-60% of the total water holding capacity, Cellulose is used as a positive reference material and 3 replicate are used in 3 different glass reactors. The test results up to 185 days are summarised in FIG. 7.

Example 24: Example 1 Prepared with PDMS X22-160AS (MW 928.24)/PPG MW 961.57

The synthesis procedure was identical to Example 1. The amounts of precursors used are as follows:
IPDI=10.374 g, PDMS=20.0.0 g, PPG=5.0 g, BMPA=0.498 g, Triethylamine=0.375 g, EDA=0.893 g, Deionised water=55.0 ml

The invention claimed is:

1. A process for preparing a polymeric membrane for suppressing weed growth and restricting water loss in soil to be used in crop production, the process comprising providing a sprayable aqueous dispersion of ionic polyurethane and spraying the aqueous dispersion onto an area of soil to be used in crop production from seeds or pre-grown plants to form a polymeric membrane on the area of soil, wherein the aqueous dispersion of ionic polyurethane further comprises a thickening agent selected from the group consisting of gelatine, alginate, wood meal, xanthan gum, polyacrylamide (PAM) and cellulose in an amount in the range of from 1 to 20 weight % of the aqueous dispersion, wherein the aqueous dispersion is sprayed onto the area of soil (i) prior to the planting of seed in the area of soil or (ii) prior to planting of pre-grown plants in the area of soil or (iii) after planting of pre-grown plants in the area of soil and wherein the polymeric membrane is retained on the area of soil to suppress weed growth in the area of soil and to provide a barrier to loss of water from the area of soil.

2. A process according to claim 1, wherein the thickening agent is selected from an alginate and carbomethoxy cellulose.

3. A process according to claim 1, wherein the thickening agent is present in the aqueous dispersion in an amount in the range of from 1-5 weight %.

4. A process according to claim 1, wherein the viscosity of the aqueous dispersion is in the range of from 50 to 200 milliPascal·second (mPa·s).

5. A process according to claim 1, wherein the ionic polyurethane comprises ionic groups selected from the group consisting of carboxylate, sulfonate and ammonium.

6. A process according to claim 1, wherein the ionic polyurethane comprises the reaction product of (a) a diisocyanate; and (b) at least one active hydrogen containing compounds and wherein at least one active hydrogen containing compound comprises an ionic or ionisable group which provide ionic groups on neutralisation.

7. A process according to claim 1, wherein the ionic polyurethane is derived from reaction of a diisocyanate and a prepolymer comprising active hydrogen groups to form an isocyanate terminated prepolymer and reacting the isocyanate terminated prepolymer with a chain extender monomer comprising ionic or ionisable groups.

8. A process according to claim 1, wherein the ionic polyurethane comprises a polyol prepolymer of molecular weight of 500-5000 Daltons.

9. A process according to claim 1, wherein the ionic polyurethane is biodegradable comprising one or more units derived from a polyester polyol and an aliphatic diisocyanate.

10. A process according to claim 7, wherein the prepolymer is chain extended with a primary or secondary amine having at least two active hydrogens and which may be quaternised to provide cationic groups.

11. A process according to claim 1, wherein the ionic groups of the ionic polyurethane are provided by reactions with one or more monomers selected from the group consisting of 2,2-bis(hydroxymethyl) propionic acid (BMPA), tartaric acid, dimethylol butanoic acid (DMBA), glycollic acid, thioglycollic acid, lactic acid, malic acid, dihydroxy malic acid, dihydroxy tartaric acid, and 2,6-dihydroxy benzoic acid and neutralisation of the resulting polymer with a tertiary amine.

12. A process according to claim 1, wherein the polymeric membrane comprises cross-linked ionic polyurethane.

13. A process according to claim 1, wherein the ionic polyurethane is present in an amount of from 10 to 60% by weight of the aqueous dispersion sprayed onto the area of soil.

14. A process according to claim 1, wherein the ionic polyurethane is applied to the area of soil at a rate of from 100 to 1000 g polyurethane solids content per square meter of area of soil.

15. A process according to claim 1, wherein the polyurethane composition comprises urea.

16. A process according to claim 15, wherein the urea is incorporated into the ionic polyurethane during preparation of a prepolymer by mixing urea with a polyol and reacting the mixture with isocyanate.

17. A process according to claim 1, further comprising planting a crop comprising a pre-grown plant into the area of soil after spraying the aqueous dispersion onto the area of soil.

18. A process according to claim 1, wherein the aqueous dispersion comprises a humate.

19. A process according to claim 8, wherein the ionic polyurethane comprises a polyol prepolymer of molecular weight of 500-10,000 Daltons.

20. A process according to claim 12, wherein the ionic polyurethane present in the dispersion is cross linked by addition of a suitable cross linker selected from the group consisting of divalent and trivalent metal cations.

21. A process according to claim 12 wherein the ionic polyurethane is cross-linked by using a slight excess of isocyanate when formulating the ionic polyurethane.

22. A process according to claim 1 wherein the aqueous dispersion further comprises a pigment or coloring agent to suppress weed growth in the area of soil.

23. A process according to claim 17 wherein the aqueous dispersion is sprayed onto the area of soil prior to or after planting the crop in the area of soil.

* * * * *